United States Patent Office
3,674,556
Patented July 4, 1972

3,674,556
METHOD FOR DRYING GLUCOSE SOLUTIONS
Roland H. Gray, Jr., Baltimore, Md., assignor to W. R. Grace & Co., New York, N.Y.
No Drawing. Filed May 3, 1971, Ser. No. 139,960
Int. Cl. C13k 1/10
U.S. Cl. 127—62　　　　　　　　　　　　　　　8 Claims

ABSTRACT OF THE DISCLOSURE

In a process for preparing dried, solid, glucose-containing products from glucose-containing solutions by drying droplets of the solution in a current of heated air and in the presence of separately introduced recycled dried product solids, the improvement which comprises maintaining the inlet temperature of the heated air in the range of from 400° to 500° Fahrenheit and the average air residence time in the drying zone in the range of 2 to 60 seconds.

---

This invention relates to improvements in the production of dried glucose-containing products from glucose-containing solutions. In one particular embodiment it relates to a procedure for substantially reducing the drying time when spray drying glucose-containing solutions in the presence of recycled product solids, and consequently increasing the dryer product output per unit of time for any given design capacity.

Methods for producing dry crystalline dextrose-containing products described in the prior art include spray drying with air at temperatures between 140 and 150° Fahrenheit and quickly cooling the product (Schopmeyer et al., U.S. Pat. 2,324,113); hot air drying, in a rotary dryer for 30 to 45 minutes and with air at inlet temperatures 300 to 350° Fahrenheit, a bed of dextrose crystals wetted with a dextrose solution (Harding—U.S. Pat. 2,369,231); a like process of rotary drying at air inlet temperatures up to 180 to 200° Fahrenheit a special blend of dextrose and polysaccharides (Wilson et al.—U.S. Pat. 2,854,359); spraying a hot dextrose (105 to 150° centigrade) liquor onto a cold (10–40° centigrade), agitated dextrose seed bed, mixing to complete crystallization and finally drying with cold air (10–40° centigrade) (Opila—U.S. Pat. 3,239,378); spontaneous cooling and nucleation of a dextrose solution at 50 to 70° centigrade by rapidly and instantaneously mixing with a cold bed of dextrose crystals (Meisel—U.S. Pat. 3,265,533); drying intimate blends of dextrose solids and dextrose solutions at temperatures of 50–100° centigrade using "cold"air or "hot" air at dryer inlet temperatures up to 95° centigrade (Oikawa—U.S. Pat. 3,271,194 and British Pat. 1,099,723); spray drying at unspecified air temperatures of high D.E. glucose solutions in the presence of recycled solids (Repsdorph et al.—U.S. Pat. 3,477,874 and a corresponding British Pat. 1,075,161); spray drying a super-saturated massecuite of dextrose with air up to 80 or 85° centigrade inlet temperature followed by aging and further drying at temperatures below 50° centigrade (Niimi et al.—U.S. Pat. 3,540,927); and spray drying an aged blend of glucose solution and recycled product at air inlet temperatures of 130–180° centigrade (Hansen—U.S. Pat. 3,567,513).

It is apparent from the foregoing summary of the prior art that all of the previous workers in the art of producing dried glucose-containing products have considered themselves to be limited to processing temperatures below about 180° centigrade and that most have limited themselves to temperatures below abou 100° centigrade.

It is an object of the present invention to provide a new and more efficient process for producing dried glucose-containing products from solutions thereof.

It is a specific object of the invention to provide a procedure for drying dextrose or other glucose-containing solutions using heated air at inlet temperatures well above those disclosed by any prior art worker.

Other objects and the advantages of the invention will be evident from the following description thereof.

In accordance with the present invention it has been discovered that droplets of glucose-containing solutions can be dried in the presence of recycled product solids, using hot air having an inlet temperature of at least about 400° Fahrenheit (i.e., about 205° centigrade) and up to as high as 500° Fahrenheit (260° centigrade) while maintaining the average air residence time in the drying zone in the range of from 2 to 60 seconds (calculated by dividing the drying zone volume by the volume flow rate of the hot drying air therethrough). While the relationship between air inlet temperature and average residence time is not necessarily linear, it is generally observed when other variables are substantially constant that shorter residence times should be used as the drier air inlet temperature increases.

In one particular embodiment the present invention is applied to the process for spray drying glucose solutions having a high D.E. value which has been generally described in the aforementioned Repsdorph et al.—U.S. Pat. 3,477,874 and British Pat. 1,075,161. In general, this involves atomization of glucose-containing solution having a D.E. value of at least about 70 and preferably at least about 90 into the hot air flowing in the spray dryer while separately feeding substantial proportions of solid glucose particles. The glucose solution may contain from about 60 to about 90 weight percent solids. Where appropriate or desirable, the solution is preheated to aid in feeding and atomization. The solid glucose, preferably recycled product, is separately and concurrently fed to the dryer in amounts sufficient to provide a weight ratio of from 0.5 to 4.0, preferably about 1.5 to about 3, parts of solids, for each part by weight of solids in the solution to be dried. Stated conversely, the weight ratio of solids in the solution to the separately introduced recycled product solids ranges from about 0.25 to about 2, preferably from about 0.33 to about 0.67. The inlet temperature of the hot drying air preferably is in the range of from about 425° to about 475° Fahrenheit and the average air residence time is preferably from about 5 to about 25 seconds.

The presently most preferred embodiment of the process of the present invention includes as further features, the use of recycled product solids having an average particle size of not greater than about 200 microns and preferably not greater than about 150 microns.

It will generally be undesirable to reduce the average particle size of the product to be recycled below about 25 microns and preferably the recycled solids will have an average particle size within the range of from about 50 to about 100 or 150 microns. Average particle size as used herein means that size where 50 weight percent of the particles are larger and 50 weight percent are smaller.

The most surprising aspect of the present invention is the observation that the unusually high drying air inlet temperatures do not result in any noticeable burning and/or darkening of the dry product. This is a truly unexpected result when considered in light of the closest known prior art, in which the air temperatures are at least 30–40° Fahrenheit and mostly 100 to 200° Fahrenheit lower than those used in the present invention.

Any glucose-containing solution may be dried in accordance with the present invention. As previously noted the invention is especially suitable for drying of high D.E. value solutions in which the glucose has a D.E. value of at least about 70 and preferably from 90 to 95 or 98 or so. The solutions are appropriately decolorized prior to drying, where desired or required, and are concentrated or diluted to the desired solids content (e.g., 70 to 75 weight percent solids) prior to drying.

The invention will be further understood from the following illustrative examples.

EXAMPLE 1

A starch hydrolyzate liquor having a D.E. value of 97 is prepared in the usual manner, refined, concentrated to 67° Brix and then dried in a spray dryer having a 7.5 foot diameter and a 60° product collection cone, providing an overall dryer volume of about 240 cubic feet. The liquor is atomized with a high vane centrifugal wheel type atomizer rotating at about 21,600 revolutions per minute. Recycle solids are fed to the drying chamber through four separate one-inch outside diameter tubes equally spaced about the periphery of the atomizer.

In one exemplary run in this dryer the glucose liquor is fed to the atomizer at about 160° Fahrenheit and at a rate of about 20 gallons per hour (this is equivalent to a solids feed rate of about 3.0 pounds per minute). The ratio of recycled solids to liquor solids is approximately 3.2. For start-up, ground product from a previous run is used. Thereafter product from the run in progress is used. Air is fed to the dryer at an inlet temperature of 440° Fahrenheit and at a rate of approximately 1,000 cubic feet per minute, giving an average dryer residence time of about 14–15 seconds. The outlet air temperature was 160° Fahrenheit.

Product recovered from the above-described exemplary run is a white powder and has a moisture content of about 2.5 percent. The particle size of the product was mostly in the range of 50–100 microns with some agglomerates in the range of 150–300 microns. The product was not noticeably burned and had no noticeable "burned" taste.

EXAMPLE 2

Another run is conducted in the same equipment and under conditions generally similar to those described in Example 1. In this run all recycled solids are ground in a Cumberland mill (a commercially available attrition mill) to an average particle size within the range from 100 to 150 microns prior to being fed to the dryer. The inlet air temperature was 440° Fahrenheit, outlet air temperature 161° Fahrenheit and product temperature 151° Fahrenheit. Average air residence time was about 15 seconds.

The recovered product has an average particle size within the range from 200 to 300 microns and a moisture content of 2.5 to 2.8 weight percent. Again there is no noticeable darkening or "burned" taste.

During the course of this run the dryer walls remained relatively clean, with no heavy wall accumulations. No difficulty is experienced with large solids masses plugging the outlet. The general condition of the dryer is satisfactory for prolonged continuous operation.

Operation in accordance with the present invention surprisingly provides quality product at higher production rates (for any given dryer capacity) than previously thought possible. This results in substantial technical and economic advantages over any known prior art processes.

What is claimed is:

1. In the process for preparing dried, solid glucose-containing products from a glucose solution by drying droplets of the said solution in a current of heated air and in the presence of 0.5 to 4 parts by weight of separately introduced recycled product solids per part by weight of solids in the solution to be dried, the improvement which comprises supplying the hot drying air at an inlet temperature of at least 400° Fahrenheit while maintaining average air residence time in the drying zone at about 60 seconds or less.

2. Improvement as defined in claim 1 in which the hot drying air inlet temperature is in the range of from 425° Fahrenheit to 475° Fahrenheit.

3. Improvement is defined in claim 2 in which the average air residence time is maintained between 5 seconds and 25 seconds.

4. Process for preparing dry glucose products comprising:
   (a) dispersing glucose particles in a current of heated air having an inlet temperature of at least 400° Fahrenheit;
   (b) separately dispensing in the heated air from about 0.25 to about 2 parts by weight, dry solids basis, of a glucose-containing solution, per part by weight of said particles;
   (c) evaporating the water from the solution;
   (d) separating the resulting dry product from the hot air stream;
   (e) recycling the necessary amounts of dry product material from step (d) to provide the particles used in the dispersion step (a); and
   (f) recovering the remainder of the dry product.

5. Process as defined in claim 4 wherein the product recycled in step (e) is reduced to an average particle size of about 200 microns or less before introduction to the dispersion step (a).

6. Process as defined in claim 5 wherein the size reduction is sufficient to provide an average particle size within the range of from about 50 to about 150 microns.

7. Process as defined in claim 5 wherein the glucose solution has a D.E. value of at least 70.

8. Process as defined in claim 7 wherein the glucose solution has a D.E. value from 90 to 98.

References Cited

UNITED STATES PATENTS

| | | | |
|---|---|---|---|
| 2,992,141 | 7/1961 | Peebles | 127—58 X |
| 3,477,874 | 11/1969 | Repsdorph | 127—58 |
| 3,540,927 | 11/1970 | Masahiro | 117—61 X |
| 3,567,513 | 3/1971 | Hansen | 127—62 |
| 3,600,222 | 8/1971 | Veltman | 127—61 |

MORRIS O. WOLK, Primary Examiner

S. MARANTZ, Assistant Examiner

U.S. Cl. X.R.

99—199; 127—58; 159—48 R

PO-1050
(5/69)

UNITED STATES PATENT OFFICE
CERTIFICATE OF CORRECTION

Patent No. 3,674,556      Dated July 4, 1972

Inventor(s) Roland H. Gray, Jr.

It is certified that error appears in the above-identified patent and that said Letters Patent are hereby corrected as shown below:

Column 4, Claim 4, line 23, the word "dispensing" should be --dispersing--.

Column 4, Claim 8, line 43, the word "Proress" should be --Process--.

Signed and sealed this 17th day of October 1972.

(SEAL)
Attest:

EDWARD M. FLETCHER, JR.
Attesting Officer

ROBERT GOTTSCHALK
Commissioner of Patents